United States Patent [19]

Mine et al.

[11] 4,269,757

[45] May 26, 1981

[54] SILOXANE COMPOSITIONS WHICH FORM CERAMICS AT HIGH TEMPERATURES

[75] Inventors: Katsutoshi Mine; Tsuneo Maruyama, both of Ichihara; Kazuhide Takeshita, Tokyo, all of Japan

[73] Assignee: Toray Silicone Company, Ltd., Tokyo, Japan

[21] Appl. No.: 113,170

[22] Filed: Jan. 18, 1980

[30] Foreign Application Priority Data

Mar. 13, 1979 [JP] Japan ................................. 54-28621

[51] Int. Cl.³ ............................................ C08L 83/04
[52] U.S. Cl. ................................ 260/37 SB; 528/39; 528/32; 427/387; 427/388.1; 428/447
[58] Field of Search ............... 528/39, 32; 260/37 SB; 427/387, 388 R; 428/447

[56] References Cited

U.S. PATENT DOCUMENTS

| | | | |
|---|---|---|---|
| 2,857,356 | 10/1958 | Goodwin, Jr. | 528/39 |
| 2,863,846 | 12/1958 | Tyler | 528/39 |
| 3,205,283 | 9/1965 | Modic | 528/39 |
| 3,403,050 | 9/1968 | Chadha | 528/39 |
| 3,489,782 | 1/1970 | Provost et al. | 528/39 |

Primary Examiner—Melvyn I. Marquis
Attorney, Agent, or Firm—Robert L. McKellar

[57] ABSTRACT

What is disclosed is a composition of matter which is a siloxane copolymer, a siloxane polymer, a ceramic forming filler and a peroxide which upon heating to 500° C. or greater forms a pliable, flexible ceramic material which is useful as insulative coatings on various electrical conductive substances such as electric wires and cables.

8 Claims, No Drawings

SILOXANE COMPOSITIONS WHICH FORM CERAMICS AT HIGH TEMPERATURES

BACKGROUND

The instant invention deals with a siloxane composition which forms an elastomeric or resinous coating upon cure but when fired to high temperatures at 500° C. or higher, forms a ceramic substance.

Silicone elastomers and resins have been used extensively in the electrical conductive coatings area because of their ability to effectively electrically insulate yet retain excellent physical properties.

These materials are different than the inorganic materials used in past years for this purpose, in that, the inorganic materials when subjected to high temperatures, i.e. 500° C. or higher, would lose their shape and also lose the ability to have the original shape restored. Because of this, coatings would pull away from the conductive substrate and the result would be burning and eventually brittleness of the coating. When this happens, the electrical insulating properties are lost and the wire or cable becomes essentially useless.

Some select siloxane-based electrical insulating materials have been used which hold their original shape but owing to their resinous nature, these materials have little or no flexibility at ordinary temperatures and therefore tend to chip and fall away. These materials can form ceramic-like coatings having excellent heat resistance and electrical properties but their handling properties show limitations leading to drawbacks in processing.

Recently, there has been a high demand for a material which can retain its original shape and electrical insulating ability after exposure to high temperatures, as in the case of fireproof electrical wire, which can be used for bare wiring in emergency electric source circuits. In response to such a demand, new materials were proposed in Japanese publications no. 51 {1976}-60240 and Japanese publication no. 51 {1976}-82319. Since a silica filler is an indispensable component of these materials, the surface portion is burned or partial foaming occurs when the cured product is exposed to high temperatures. Therefore, it is difficult to obtain a ceramic product with a high uniformity and a high dimensional stability. Since a platinum compound is also an indispensable component, the resulting ceramic product is very dense after exposure to high temperatures. Therefore, it is difficult to obtain a low density ceramic with these materials.

THE INVENTION

The present invention provides a siloxane composition which forms an elastomer or a resin-like substance by curing in a normal temperature range and which is subsequently converted to a ceramic substance which is a lightweight ceramic material having excellent dimensional stability, strength, electrical insulating ability and thermal impact properties, in an attempt to overcome the drawbacks of the existing materials as mentioned above.

That is, the present invention concerns a silicone composition which forms a ceramic at high temperatures which is a composition of matter consisting essentially of (A) 100 parts by weight of a siloxane copolymer consisting essentially of $R_3SiO_{\frac{1}{2}}$ units and $SiO_{4/2}$ units wherein R is a substituted or unsubstituted monovalent hydrocarbon radical containing 1-10 carbon atoms; (B) 0-600 parts by weight of an organopolysiloxane polymer having the average unit formula $$R_aSiO_{(4-a)/2}$$

and containing no $SiO_{4/2}$ units wherein R has the same meaning as in (A) above and a has an average value of 1-3; (C) 3-500 parts by weight of a ceramic-forming filler and, (D) 0.1-10 parts by weight of an organic peroxide. This invention also concerns a solid substrate coated with the inventive composition and the substrate when coated with the inventive composition, and heated to 500° C. or higher to form a ceramic.

Thus, this invention is also a solid substrate coated with a composition of matter consisting essentially of (A) 100 parts by weight of a siloxane copolymer consisting essentially of $R_3SiO_{\frac{1}{2}}$ units and $SiO_{4/2}$ units wherein R is a substituted or unsubstituted monovalent hydrocarbon radical containing 1-10 carbon atoms; (B) 0-600 parts by weight of an organopolysiloxane polymer having the average unit formula $$R_aSiO_{(4-a)/2}$$

and containing no $SiO_{4/2}$ units wherein R has the same meaning as in (A) above and a has an average value of 1-3; (C) 3-500 parts by weight of a ceramic-forming filler and, (D) 0.1-10 parts by weight of an organic peroxide.

Component (A) is the principal component of the composition of this invention. Component (A) essentially consists of a siloxane copolymer having $R_3SiO_{\frac{1}{2}}$ units and $SiO_{4/2}$ units. This implies that $R_3SiO_{\frac{1}{2}}$ units and $SiO_{4/2}$ units are the principal components, but it also implies that small amounts of other units such as $R_2SiO_{2/2}$ units and $RSiO_{3/2}$ units can be present. The molar ratio of $R_3SiO_{\frac{1}{2}}$ units of $SiO_{4/2}$ units preferably ranges from 0.2/1 to 2.5/1. In these units, R represents substituted or unsubstituted monovalent hydrocarbon radicals with up to 10 carbons which are selected from methyl, ethyl, propyl, vinyl and phenyl groups, or halogen-substituted groups or those types. In particular, methyl groups and vinyl groups are the most suitable as R. This component can be easily produced by various methods. For example, a siloxane copolymer is produced by cohydrolysis of trimethylmonochlorosilane, dimethylvinylmonochlorosilane and tetrachlorosilane. Alternatively, it can be produced by cohydrolysis of trimethylmethoxysilane, dimethylvinylmethoxysilane and ethyl orthosilicate. Alternatively, it can be produced by the reaction of silica sol, which is obtained by the acidification of water glass, with trimethylmonochlorosilane. This component is generally a solid or powder at room temperature and it is melted by heating.

Component (B) is a component which controls the viscosity of the composition of this invention and the flexibility of the cured product. It has the average unit formula $$R_aSiO_{(4-a)/2}.$$

This component is an organopolysiloxane polymer consisting essentially of $RSiO_{3/2}$ units, $R_2SiO_{2/2}$ units and $R_3SiO_{\frac{1}{2}}$ units. The molecular structure can be a linear chain, branched chain, cyclic or network structure. R has the same meaning as set forth above. In addition, this component can contain small amounts of hydroxyl groups, alkoxy groups or hydrogen atoms, which are bound to a silicon atom but cannot contain any units of the formula $SiO_{4/1}$.

In the unit formula

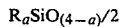

the values of a range from 1 to 3. From the standpoint of the molding workability of the compositions of this invention and the flexibility of the cured product, a is preferably 1.9-2.1. The viscosity preferably ranges from 0.01 to 100 Pa·s at 25° C. If this component is used in a very large amount, the ceramic formation of the cured product may be hindered. Thus, the amount of this component should be 600 parts by weight or less to 100 parts by weight of component (A).

Component (C) is an especially important component of this invention. Such materials are ceramic forming fillers. Examples of these ceramic forming fillers are glass, asbestos, minerals such as kaolinite and montmorillonite, mica, talc, aluminum silicate, magnesium silicate, zinc oxide, magnesium oxide, tungsten carbide, titanium carbide, molybdenum carbide, sodium aluminate, silicon nitride, boron nitride, aluminum nitride, aluminum oxide, zirconium titanate, silicon carbide, potassium titanate, zinc silicate, zirconium silicate, titanium silicate, and composite silicates such as aluminocalcium silicate and aluminolithium silicate. These ceramic forming fillers can be obtained from natural sources or from synthetic substances. In all cases, the substrate is preferably used in a fine powder form such as is used in conventional ceramic fillers. As the amount of component (C) increases, the characteristics of the ceramic when exposed to high temperatures are improved. However, the mixing ratio generally ranges from 3 to 500 parts by weight and preferably 5 to 100 parts by weight, considering the flexibility of the coated film after curing the composition in a normal temperature range. In addition, two or more types of ceramic forming fillers can be used in the mixture.

An organic peroxide, component (D), is a common catalyst which is used for accelerating the curing of the composition of this invention by heating. Examples of these organic peroxides are: benzoyl peroxide, tert-butyl perbenzoate, 2,4-dichlorobenzoyl peroxide and monochlorobenzoyl peroxide. The amount of component (D) ranges from 0.1 to 10 parts by weight to 100 parts by weight of component (A) and preferably from 0.3 to 6 parts by weight.

The composition of this invention is produced as follows. First, components (A), (B) and (C) are blended using a commonly used mixing device such as a Ross mixer, a planetary mixer, a kneader mixer or a two roll mixer, and then component (D) is generally added. Components (A), (B) and (C) can be blended at the same time or in an appropriate stepwise manner. The mixture can be heated and stirred for the purpose of the acceleration of uniform mixing.

When the four components of the composition of this invention (three components when no component (B) is added) are totally blended, curing occurs after a specified time at a specified temperature. According to the types of each component and the proportions of these components, the product is obtained in an elastomer form or in a resin form. It is advantageous to heat the composition to a temperature of 100°-200° C. or higher. Although the compositions of this invention is converted to either an elastomer form or a resin form by curing, a ceramic is formed when it is exposed to a high temperature of 500° C. or higher. As a result, a light-weight ceramic material having excellent dimensional stability, strength, electrical insulating ability and thermal shock resistance, can be produced.

Thus, also contemplated within the scope of this invention is an inventive composition coated on a solid substrate and heated to 500° C. or higher to ceramify which composition consists essentially of (A) 100 parts by weight of a siloxane copolymer consisting essentially of $R_3SiO_{\frac{1}{2}}$ units and $SiO_{4/2}$ units wherein R is a substituted or unsubstituted monovalent hydrocarbon radical containing 1-10 carbon atoms; (B) 0-600 parts by weight of an organopolysiloxane polymer having the average unit formula

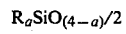

and containing no $SiO_{4/2}$ units wherein R has the same meaning as in (A) above and a has an average value of 1-3; (C) 3-500 parts by weight of a ceramic-forming filler and, (D) 0.1-10 parts by weight of an organic peroxide.

If desirable, other applicable additional components such as inorganic fillers and pigments, and organic solvents such as xylene, toluene and trichloroethylene can be used in addition to components (A), (B), (C) and (D) of this invention.

The composition of this invention is very useful in applications requiring mechanical strength and electrical insulating ability when exposed to high temperatures. For example, the compositions of this invention are useful as coating materials for fire resistant electric wires and cables, impregnating agents for transformers, coating materials, coating materials for insulators for high-tension transmission lines, and thermal insulating materials for microwave ovens and conventional ovens.

The examples are presented to illustrate the invention and should not be construed as limiting the invention.

EXAMPLES 1-6

Compositions were prepared by mixing the following four components (A), (B), (C) and (D):

Component (A): 100 parts by weight of a silicone copolymer consisting of 43 mol % of $SiO_{4/2}$ units, 30 mol % of $(CH_3)_3SiO_{\frac{1}{2}}$ units, 15mol % of $(CH_3)_2(CH_2\!=\!CH)SiO_{\frac{1}{2}}$ units and 12 mol % of $CH_2\!=\!CH(CH_3O)_2SiO_{\frac{1}{2}}$ units, Components (B): 0—30 parts by weight of a dimethylpolysiloxane having dimethylpolysiloxane having dimethylvinylsilyl endblocks as shown in the following formula:

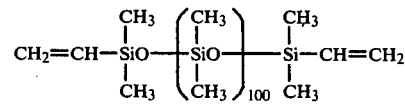

Component (C): a total of 50 parts by weight of either zinc oxide powder, alumina powder or mica powder, and Component (D): 2 parts by weight of 2,4-dichlorobenzoyl peroxide. The compositions were poured into a mold with a depth of 2 mm and compressed molding was carried out at 120° C. for 15 minutes. The resulting sheets exhibited excellent flexibility. When the sheets were exposed to air at 850° C. for 30 minutes, they were converted to firm and light ceramic substances without any cracks.

As comparisons, other compositions were prepared similarly except for the fact that component (A) or component (C) was excluded from the above-mentioned compositions. The compositions obtained were cured and exposed to high temperatures. The results are summarized in Table I.

The inventive compositions were coated in a thickness of 0.5 mm on copper wire with a width of 1 mm by extrusion molding and the coatings were cured by heating to 400° C. for 3 minutes. The coated electric wires exhibited excellent flexibility. The coated wires were also exposed to the same atmosphere at 850° C. for 30 minutes. No cracks were produced in the coated electric wires, while the coat was converted to a firm and light ceramic material which adhered well to the copper wire.

(C) 3-500 parts by weight of a ceramic-forming filler and, (D) 0.1-10 parts by weight of an organic peroxide.

2. The composition of claim 1 wherein for every 100 parts by weight of component (A) there is present 0-30 parts by weight of component (B), 20-50 parts by weight of component (C) and 2-10 parts by weight of component (D).

3. The composition as claimed in claim 1 wherein component (A) is a copolymer consisting essentially of 43 mol % of $SiO_{4/2}$ units, 30 mol % of $(CH_3)_3SiO_{\frac{1}{2}}$ units, 15 mol % of $(CH_3)_2(CH_2=CH)SiO_{\frac{1}{2}}$ units and 12 mol % of $CH_2=CH(CH_3O)_2SiO_{\frac{1}{2}}$ units; component (B) is a vinyldimethyl endblocked polydimethylsiloxane; component (C) is selected from a group consisting essentially of zinc oxide powder, alumina powder and mica powder and component (D) is 2,4-dichlorobenzoyl peroxide.

4. The composition as claimed in claim 3 wherein

TABLE I

| | Example No. | | | | | | Comparison Example No. | |
|---|---|---|---|---|---|---|---|---|
| | 1 | 2 | 3 | 4 | 5 | 6 | 1 | 2 |
| Components (parts by weight) | | | | | | | | |
| (A) | 100 | 100 | 100 | 100 | 100 | 100 | 100 | — |
| (B) | 30 | 30 | 30 | 30 | 30 | — | 30 | 130 |
| (C) | | | | | | | | |
| Zinc oxides | 50 | — | — | 25 | — | — | — | — |
| Alumina | — | 50 | — | 25 | 25 | — | — | — |
| Mica | — | — | 50 | — | 25 | 50 | — | 50 |
| (D) | 2.0 | 2.0 | 2.0 | 2.0 | 2.0 | 2.0 | 2.0 | 2.0 |
| Physical properties of cured sheet test | | | | | | | | |
| Tensile strength (kg/cm$^2$) | 40 | 38 | 43 | 35 | 41 | 33 | 25 | 27 |
| Elongation (%) | 110 | 115 | 105 | 125 | 110 | 100 | 150 | 120 |
| Sheet after the treatment at 850° C. for 30 minutes | No cracks | No cracks | No cracks | No cracks | No cracks | No cracks | Fragmentation | Numerous cracks |
| Thermal shock resistance (state after rapidly cooling from 800° C. to 0° C.) | No cracks | No cracks | No cracks | No cracks | No cracks | No cracks | Fragmentation | Fragmentation |

That which is claimed is:

1. A composition of matter consisting essentially of
(A) 100 parts by weight of a siloxane copolymer consisting essentially of $R_3SiO_{\frac{1}{2}}$ units and $SiO_{4/2}$ units wherein R is a substituted or unsubstituted monovalent hydrocarbon radical containing 1-10 carbon atoms;
(B) 0-600 parts by weight of an organopolysiloxane polymer having the average unit formula $$R_aSiO_{(4-a)/2}$$

and containing no $SiO_{4/2}$ units wherein R has the same meaning as in (A) above and a has an average value of 1-3;

component (B), the vinyldimethyl endblocked polydimethylsiloxane is

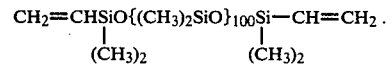

5. A solid substrate coated with the composition of claim 1.

6. A solid substrate coated with the composition as claimed in claim 1 and heated in excess of 500° C.

7. A solid substrate as claimed in claim 5 which is in the form of wire or cable.

8. A solid substrate as claimed in claim 6 which is in the form of wire or cable.

* * * * *

UNITED STATES PATENT AND TRADEMARK OFFICE
CERTIFICATE OF CORRECTION

PATENT NO. : 4,269,757

DATED : May 26, 1981

INVENTOR(S) : Katsutoshi Mine, Tsuneo Maruyama, & Kazuhide Takeshita

It is certified that error appears in the above-identified patent and that said Letters Patent are hereby corrected as shown below:

In Column 2, line 37; the phrase reading "of $SiO_{4/2}$ units" should read "to $SiO_{4/2}$ units".

In Column 3, line 2; the formula reading "$SiO_{4/1}$" should read "$SiO_{4/2}$".

In Column 3, line 7; the word reading "compositions" should read "composition".

In Column 3, line 29; the word reading "substrate" should read "substance".

In Column 3, line 65; the word reading "compositions" should read "composition".

In Column 4, line 48; the word reading "Components" should read "Component".

UNITED STATES PATENT AND TRADEMARK OFFICE
CERTIFICATE OF CORRECTION

PATENT NO. : 4,269,757
DATED : May 26, 1981
INVENTOR(S) : Katsutoshi Mine, Tsuneo Maruyama, & Kazuhide Takeshita It is certified that error appears in the above-identified patent and that said Letters Patent are hereby corrected as shown below:

In Column 4, line 49; the line reading "ylpolysiloxane having dimethylpolysiloxane having" should read "ylpolysiloxane having".

Signed and Sealed this

Twenty-second Day of September 1981

[SEAL]

Attest:

GERALD J. MOSSINGHOFF

Attesting Officer

Commissioner of Patents and Trademarks